Patented Feb. 22, 1949

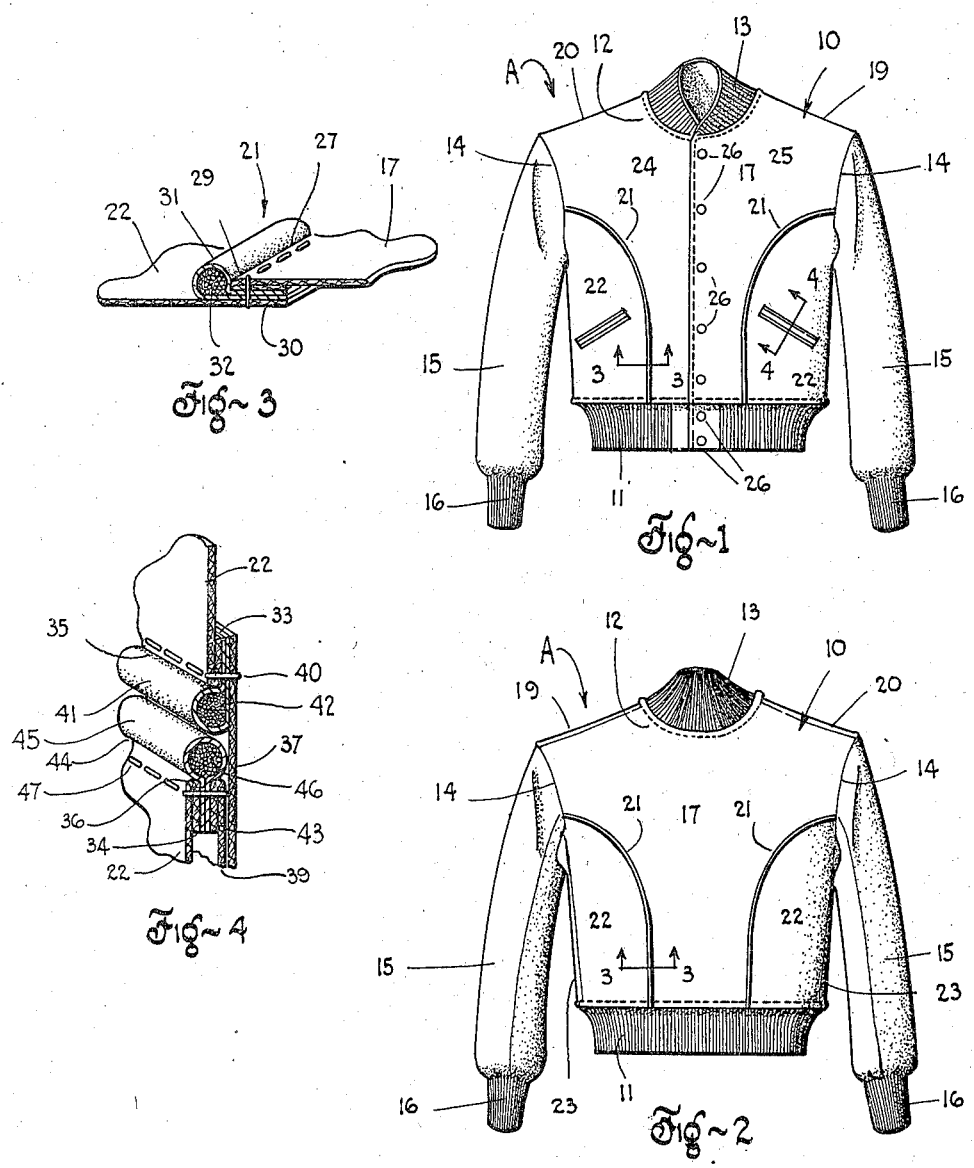

2,462,361

UNITED STATES PATENT OFFICE 2,462,361

JACKET CONSTRUCTION

Bruno F. Cassens, St. Paul, Minn., assignor to Butwin Sportswear Co., St. Paul, Minn., a partnership Application December 20, 1946, Serial No. 717,487

7 Claims. (Cl. 2—108)

1

My invention relates to an improvement in jackets and more particularly in a jacket trimmed with luminescent or light reflective material.

In the past few years the quality of luminescent and light reflective films has been considerably improved. These materials have been used as a coating on paper, fabric, and various base materials. The use of these materials in the manufacture of garments has not been attempted, as I am aware. Garments possessing luminescent or light reflecting properties have decided advantages. For example a jacket formed of luminescent or light reflective material is extremely desirable for use by a pedestrian traveling along a poorly illuminated road or highway at night. The formation of an entire garment of luminescent or light reflective material, however, also has certain disadvantages. Most such materials are unusually sensitive to wear. A garment entirely formed of luminescent or light reflective material would have a tendency to wear unevenly and this wear would be much more obvious than with usual garment material.

It is an object of the present invention to provide a jacket or other garment having luminescent or light reflective material incorporated therein as a trim. As a result the usual appearance of the jacket is not greatly changed by the addition of the light reflective material. At the same time, however, the trim possesses sufficient area to serve the intended purpose of making the wearer of the garment visible at night.

A feature of the present invention resides in the use of a band of luminescent or light reflective material extending along the front and rear surfaces of the jacket where this strip will be readily visible either from in front of the wearer or from the rear. As a result the wearer will be readily visible from a substantial distance at night.

An important feature of the present invention resides in the provision of a band of luminescent or light reflective material which is generally cylindrical in form. As a result the luminescent material or light reflective material may be seen from a considerable angle to the side of the wearer. This is particularly advantageous when the band is formed of light reflective material, as this construction insures a light reflective surface capable of reflecting light rays directed toward the jacket from virtually any angle.

A further feature of the present invention resides in the provision of a folded strip of luminescent or light reflective material enclosing a cord or similar flexible cylindrical member adjacent the fold. As a result the folded edge of the material is generally cylindrical in form and acts to provide a trim which may be visible from virtually any angle.

An added feature of the present invention lies in the provision of a jacket having bands of light reflective or luminescent material which extend in spaced relation upwardly from the waist line and outwardly toward the sleeve holes of the garment body on both the front and rear surfaces of the jacket. I have found that the strips when thus positioned are readily visible from a considerable distance at night and the strips thus positioned are hard to conceal with the arms, thus obviating the danger of accidental concealment of the strips.

These and other objects and novel features of my invention will be more clearly and fully set forth in the following specification and claims.

In the drawings forming a part of my specification:

Figure 1 is a front elevational view of my garment showing the construction thereof.

Figure 2 is a rear elevational view of the garment showing the arrangement of the trim thereon.

Figure 3 is a sectional view through a portion of the trim, the position of the section being indicated by the line 3—3 of Figures 1 and 2.

Figure 4 is a sectional view through a pocket of the garment, the position of the section being indicated by the line 4—4 of Figure 1.

The jacket A, illustrated in the drawings, may be of any desired shape or form. In the construction illustrated the jacket includes a body portion indicated in general by the numeral 10, which extends down to the waist of the wearer and is provided at its lower extremity with a waist band 11 which may be formed of knitted material. The body portion 10 is also provided with a neck opening 12 which may be provided with a collar 13 attached thereto. The collar 13 may also be of knitted material. Sleeve openings 14 are provided near the shoulders of the body to which are attached sleeves 15 which may be provided with cuffs 16 of knitted material. As previously stated this construction is merely a suggested form of construction.

The back and front of the jacket A are generally similar in form and construction, with the exception that the front of the garment is centrally divided so that the jacket may be easily donned or removed. Both the back and front of the garment include a generally T-shaped panel 17, the upper edges of the rear panel 17 being connected to the upper edges of the front panel 17 along shoulder seams 19 and 20. The opposite side edges of the front and rear panels 17 are connected by curved seams 21 to segmental panels 22. The segmental panels 22 of the back of the garment are connected to the segmental panels 22 of the front of the garment along vertical side seams 23. The main front panel 17 in reality comprises two panels 24 and 25 which are centrally overlapped and connected by snaps 26 or other suitable connecting means. It is the seams 21 which are of primary importance in the jacket construction.

In Figure 3 of the drawings I disclose a typical seam 21. The curved side edge 27 of a panel 17 is folded backwardly upon itself as indicated at 29 to provide a folded fabric edge overlying the marginal edge 30 of a segmental panel 22. A folded strip 31 of light reflecting or luminescent material or fabric having luminescent or light reflecting qualities is interposed between the folded edge 29 of the panel 17 and the edge 30 of the panel 22. The folded side of the strip overlies the panel 22 as illustrated in Figure 3 of the drawings and encloses a substantially cylindrical cord 32 or similar filling member. As a result a substantially cylindrical trim strip is provided having a luminescent or light reflecting surface. Due to the cylindrical shape of the exposed portion of this strip, light rays striking the strip from almost any angle will reflect so as to clearly illuminate the trim strip. In view of the fact that the seams 21 are relatively close together adjacent the waist line of the garment and curve upwardly and outwardly toward the armholes 14, the trim is so located as to be visible from the sides of the garment as well as to the front and rear thereof. Accordingly light will be reflected from the strip 31 when light rays strike the garment from almost any angle.

In Figure 4 of the drawings I disclose the pocket construction. This figure shows a section through the outer layer of the garment at the pocket, but omits the jacket lining. This lining is also omitted from Figure 3 of the drawings to simplify the illustration.

The material forming the front panels 22 is cut along an inclined line to form a pocket opening. The cut edges of the panel 22 are indicated in Figure 4 by the numerals 33 and 34. The cut edge 33 is folded inwardly upon itself to provide a folded edge 35. The cut edge 34 is also folded downwardly and inwardly of the panel 22 to provide a folded edge 36. Thus a pocket opening is formed having upper and lower folded edges 35 and 36 which are spaced apart the distance of the folded edges.

The pocket is formed of two substantially parallel panels 37 and 39 which are marginally connected together along their side and bottom edges. The upper edge of the panel 37 lies inwardly of the folded edge 35 and is connected thereto by stitching 40. A strip 41 of light reflective material is folded intermediate its longitudinal edges to enclose a cylindrical cord 42 or other flexible substantially cylindrical object. The free edges of the strip 41 are folded between the folded edge 35 and the upper edge of the panel 37 and are held in this position by the stitching 40. As a result a substantially cylindrical luminescent or light reflective trim member extends along the folded edge 35 partially defining the pocket opening.

The upper edge of the pocket panel 39 is folded downwardly upon itself at 43 to form a folded edge 44 parallel and adjacent the fold 36. A strip 45 of luminescent or light reflective material is folded between its longitudinal edges to enclose a cord 46 or similar substantially cylindrical flexible member, the free edges of the strip 45 being interposed between the folded edges 36 and 44. Stitching 47 anchors the strip 45 in place, thus producing a luminescent or light reflective trim of substantially cylindrical shape along the other edge of the material defining each pocket opening. The strips 41 and 45 extend the length of the pocket opening as indicated in Figure 1 of the drawings.

There are various materials which are luminescent and which may be used to form the surface of the strips 31 and 41 and 45. This material may contain a material such as phosphorus which gives off light, or may be material capable of storing up light to which it is exposed and emitting this light for a period of time during darkness. If the trim strips are formed of light reflective material, they may comprise a film having anchored therein a great number of tiny beads of glass or other material, these beads being capable of reflecting light. In either event the corded cylindrical trim strip is so positioned as to be visible for a considerable distance. Furthermore the cylindrical form of the strip enables it to be seen from virtually any direction.

In accordance with the patent statutes, I have described the principles of construction and operation of my jacket construction and while I have endeavored to set forth the best embodiment thereof, I desire to have it understood that obvious changes may be made within the scope of the following claims without departing from the spirit of my invention.

I claim:

1. A garment having trim thereupon along selected seams of the garment, said trim including a substantially cylindrical fold of material having a beaded surface possessing relatively high light reflective properties projecting beyond the seams.

2. A garment trim for use in a garment seam, the trim including a folded strip of material having a beaded surface possessing relatively high light reflective properties, the free edges of said strip being anchored in said seam with the folded edge projecting therefrom.

3. A garment trim for use in a garment seam, the trim including a folded strip of material having a beaded surface possessing relatively high light reflective properties, the free edges of said strip being anchored in said seam with the folded edge projecting therefrom, said folded edge enclosing a substantially cylindrical flexible member.

4. A garment including a trim of luminescent material, said trim being supported in a garment seam and comprising a folded strip of luminescent material having the free edges thereof anchored within the same.

5. A garment including a trim of luminescent material, said trim being supported in a garment seam and comprising a folded strip of luminescent material having the free edges thereof anchored within the same, the folded edge of the strip containing a substantially cylindrical flexible member.

6. A jacket including a pair of upwardly and outwardly diverging seams in the front and rear surfaces thereof, and a strip of material having a beaded surface possessing relatively high light reflective properties anchored in each of said seams.

7. A jacket including front and rear panels, upwardly and outwardly diverging seams in said front and rear panels, and a trim strip anchored in each of said seams, said anchor strips comprising a folded strip of material having a beaded surface possessing relatively high light reflective properties having its longitudinal free edges anchored within the seam and having the folded edge projecting beyond the seam, and a substantially cylindrical flexible member enclosed within said folded edge of said strips.

BRUNO F. CASSENS.

REFERENCES CITED

The following references are of record in the file of this patent:

UNITED STATES PATENTS

| Number | Name | Date |
|---|---|---|
| 273,074 | Heath | Feb. 27, 1883 |
| 1,244,065 | Miller | Oct. 23, 1917 |
| 1,426,024 | Thureson | Aug. 15, 1922 |
| 1,562,930 | Turner | Nov. 24, 1925 |
| 2,130,439 | Wheeler | Sept. 20, 1938 |
| 2,310,740 | Leavy | Feb. 9, 1943 |